US012607351B2

(12) United States Patent
Lee et al.

(10) Patent No.: US 12,607,351 B2
(45) Date of Patent: Apr. 21, 2026

(54) INCINERATION SYSTEM

(71) Applicant: Ming-Chiu Lee, Taoyuan City (TW)

(72) Inventors: Ming-Chiu Lee, Taoyuan City (TW);
Tzung-Hou Huang, Taoyuan City
(TW)

(73) Assignee: Ming-Chiu Lee, Taoyuan City (TW)

( * ) Notice: Subject to any disclaimer, the term of this
patent is extended or adjusted under 35
U.S.C. 154(b) by 580 days.

(21) Appl. No.: 18/330,726

(22) Filed: Jun. 7, 2023

(65) Prior Publication Data

US 2024/0035655 A1     Feb. 1, 2024

(30) Foreign Application Priority Data

Jul. 27, 2022     (TW) ................................. 111208056

(51) Int. Cl.
*F23G 5/46*          (2006.01)
*B09B 3/45*          (2022.01)
*F23G 5/00*          (2006.01)

(52) U.S. Cl.
CPC .................. *F23G 5/46* (2013.01); *B09B 3/45*
(2022.01); *F23G 5/006* (2013.01); *F23G*
*2200/00* (2013.01)

(58) Field of Classification Search
CPC ........ F23G 5/46; F23G 5/006; F23G 2200/00;
F23G 5/444; B09B 3/45
See application file for complete search history.

(56) References Cited

U.S. PATENT DOCUMENTS

| | | | | |
|---|---|---|---|---|
| 1,189,638 A | * | 7/1916 | Testrup et al. ............. | C10J 3/00 |
| | | | | 48/209 |
| 5,471,937 A | * | 12/1995 | Kosky ..................... | F23G 5/027 |
| | | | | 110/211 |
| 2010/0300112 A1 | * | 12/2010 | Hannemann .............. | F02C 3/28 |
| | | | | 60/39.461 |
| 2014/0251901 A1 | * | 9/2014 | Hojsgaard ............... | F23G 7/001 |
| | | | | 210/609 |
| 2023/0025491 A1 | * | 1/2023 | Kraemer ................. | F23C 6/042 |
| 2023/0257783 A1 | * | 8/2023 | Noma .................... | C12M 21/04 |
| | | | | 435/167 |

* cited by examiner

*Primary Examiner* — David J Laux
(74) *Attorney, Agent, or Firm* — Morse, Barnes-Brown &
Pendleton, P.C.; Martin Z. Zhang

(57)     ABSTRACT

An incineration system is adapted for burning an incinera-
tion matter, and for generating a regenerative matter by
hydrolyzing a hydrolysis matter. The incineration system
includes an incineration device, a boiler device, a power
generating device, and a thermal hydrolysis device. The
incineration device includes an incinerator that is adapted
for receiving the incineration matter and for burning the
incineration matter to thereby generate heated air. The boiler
device receives the heated air from the incinerator and
generates steam via the heated air. The power generating
device receives the steam from the boiler device to generate
electric power. The thermal hydrolysis device includes a
tank that is adapted for receiving the hydrolysis matter and
the steam. The thermal hydrolysis device is adapted for
hydrolyzing the hydrolysis matter via the steam, for gener-
ating the regenerative matter by hydrolyzing the hydrolysis
matter, and for outputting the regenerative matter.

10 Claims, 1 Drawing Sheet

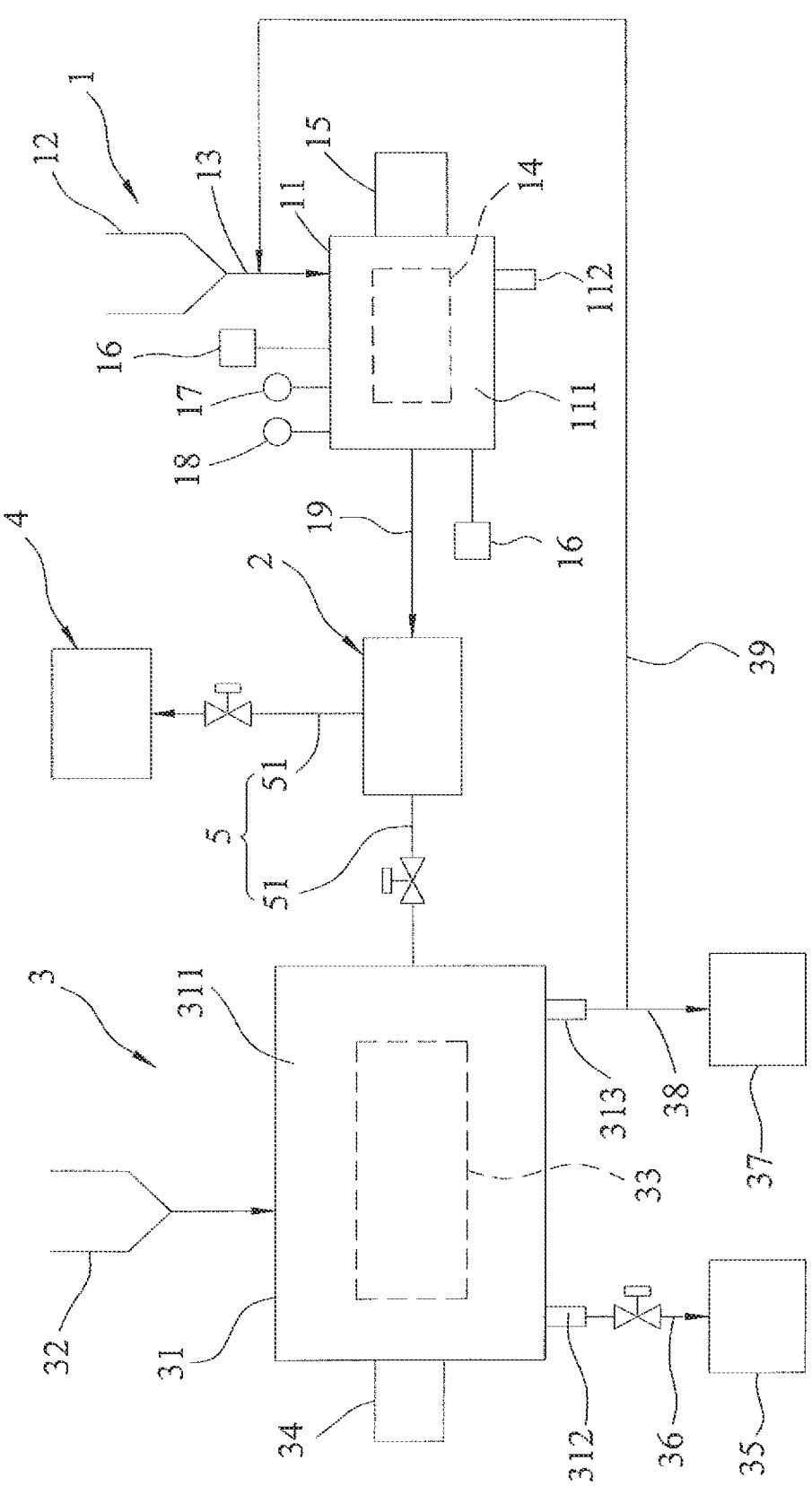

INCINERATION SYSTEM

CROSS-REFERENCE TO RELATED APPLICATION

This application claims priority to Taiwanese Utility Model Patent Application No. 111208056, filed on Jul. 27, 2022.

FIELD

The disclosure relates to an incineration system, and more particularly to an incineration system that has a thermal hydrolysis device.

BACKGROUND

A conventional incineration system is used for an incineration process, and includes an incinerator, a boiler, and a steam turbo-generator that will operate in a subsequent stage of the incineration process.

The incinerator is used for burning waste to generate heated air. The boiler is used for receiving the heated air generated by the incinerator to generate steam. The steam turbo-generator is used for receiving the steam generated by the boiler to generate electric power.

However, because energy generated by the steam turbo-generator is about one-fifth of energy generated by burning the waste in the incinerator, and the heated air in the conventional incineration system is only used for generating the electric power, energy conversion efficiency of the conventional incineration system is only about 20%. That is to say, in the conventional incineration system, heat from the incinerator is not fully utilized.

SUMMARY

Therefore, an object of the disclosure is to provide an incineration system that can alleviate the drawback of the prior art.

According to the disclosure, the incineration system is adapted for burning an incineration matter, and for generating a regenerative matter by hydrolyzing a hydrolysis matter. The incineration system includes an incineration device, a boiler device, a power generating device, and a thermal hydrolysis device. The incineration device includes an incinerator that is adapted for receiving the incineration matter and for burning the incineration matter to thereby generate heated air. The boiler device receives the heated air from the incinerator and generates steam via the heated air. The power generating device receives the steam from the boiler device to generate electric power. The thermal hydrolysis device includes a tank that is adapted for receiving the hydrolysis matter and the steam. The thermal hydrolysis device is adapted for hydrolyzing the hydrolysis matter via the steam, for generating the regenerative matter by hydrolyzing the hydrolysis matter, and for outputting the regenerative matter.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

The sole FIGURE of this application is a schematic view of an embodiment of an incineration system according to the disclosure.

DETAILED DESCRIPTION

Referring to the FIGURE, an embodiment of an incineration system is adapted for burning an incineration matter (not shown), and is adapted for generating a regenerative matter by hydrolyzing a hydrolysis matter. Each of the incineration matter and the hydrolysis matter may be, but not limited to, business waste or household waste. In this embodiment, the incineration system may be configured to be a down-fired incineration system. The incineration system includes an incineration device 1, a boiler device 2, a thermal hydrolysis device 3, a power generating device 4, and a steam pipe unit 5.

The incineration device 1 includes an incinerator 11, an incineration feed hopper 12, an incineration feed pipe 13, an incineration stirring unit 14, an incineration actuation unit 15, a plurality of burners 16, an oxygen detector 17, an emergency discharge unit 18, and an air pipe 19 that interconnects the incinerator 11 and the boiler device 2.

The incinerator 11 defines a combustion chamber 111, and has a residue outlet 112 that is in spatial communication with the combustion chamber 111. The incineration feed hopper 12 is disposed on the incinerator 11 via the incineration feed pipe 13 (i.e., the incineration feed pipe 13 interconnects the incineration feed hopper 12 and the incinerator 11), and is adapted for receiving the incineration matter. The incineration feed pipe 13 is adapted for transporting the incineration matter from the incineration feed hopper 12 into the incinerator 11.

The incineration stirring unit 14 is hollow, is barrel-shaped, has a plurality of openings, is substantially elongated in a horizontal direction, and is disposed in the combustion chamber 111. The incineration actuation unit 15 includes a roller subunit (not shown) that is disposed on the incinerator 11 and that is connected to the incineration stirring unit 14, and a motor (not shown) that is operable to urge the roller subunit to drive the incineration stirring unit 14 to rotate so that the incineration stirring unit 14 stirs the incineration matter in the incinerator 11.

The burners 16, the oxygen detector 17, the emergency discharge unit 18, and the air pipe 19 are disposed on the incinerator 11. The burners 16 are adapted for burning the incineration matter to thereby generate heated air. It is noted that, in one embodiment, the incineration system may include only one burner. The oxygen detector 17 is used to measure oxygen concentration in the combustion chamber 111. In this embodiment, the emergency discharge unit 18 is configured to be a pressure relief valve. When a value of pressure in the combustion chamber 111 of the incinerator 11 is greater than a predetermined pressure value, the emergency discharge unit 18 is operable to discharge gas from the combustion chamber 111 so as to protect the incinerator 11 from being damaged.

The thermal hydrolysis device 3 includes a tank 31, a hydrolysis feed hopper 32, a hydrolysis stirring unit 33, a hydrolysis actuation unit 34, a collecting unit 35, a collection pipe 36, a recycling unit 37, a regeneration pipe 38, and a transfer pipe 39.

The tank 31 defines a hydrolysis chamber 311, and has a hydrolysis outlet 312 and a regeneration outlet 313 each of which is in spatial communication with the hydrolysis chamber 311. The hydrolysis feed hopper 32 is disposed on the tank 31, and is adapted for receiving the hydrolysis matter so that the hydrolysis matter may be transported into the hydrolysis chamber 311.

In this embodiment, the hydrolysis stirring unit 33 is disposed in the hydrolysis chamber 311, and is configured to be a screw rod that has a plurality of stirring blades (not shown). The incineration actuation unit 34 includes a roller subunit (not shown) that is disposed on the tank 31 and that is connected to the hydrolysis stirring unit 33, and a motor (not shown) that is operable to urge the roller subunit thereof to drive the hydrolysis stirring unit 33 to rotate so that the hydrolysis stirring unit 33 stirs the hydrolysis matter in the tank 31. The collection pipe 36 spatially communicates with the hydrolysis outlet 312 and the collecting unit 35 such that the hydrolysis outlet 312 is in spatial communication with the collecting unit 35. The regeneration pipe 38 is connected to the regeneration outlet 313, spatially communicates with the regeneration outlet 313 and the recycling unit 37, and is adapted for transporting the regenerative matter from the regeneration outlet 313 to the recycling unit 37. The transfer pipe 39 interconnects the regeneration pipe 38 and the incineration feed pipe 13, and is adapted for transporting the regenerative matter into the incinerator 11.

The boiler device 2 receives the heated air from the incinerator 11 and generates steam via the heated air. The power generating device 4 is connected to the steam pipe unit 5, and receives the steam from the boiler device 2 to generate electric power. The power generating device 4 may be, but not limited to, a steam turbo-generator.

The steam pipe unit 5 includes two gas supply pipes 51. One of the gas supply pipes 51 interconnects the boiler device 2 and the tank 31. The other one of the gas supply pipes 51 interconnects the boiler device 2 and the power generating device 4.

When the incineration system is in operation, the incineration feed hopper 12 receives the incineration matter, and the incineration feed pipe 13 transports the incineration matter from the incineration feed hopper 12 into the incineration stirring unit 14. Then, the incineration actuation unit 15 drives the incineration stirring unit 14 to rotate while the burners 16 burn the incineration matter so that the incineration matter is completely burned. Next, the air pipe 19 transports the heated air that is generated from combustion of the incineration matter from the incinerator 11 to the boiler device 2. Residue generated after the combustion of the incineration matter will be discharged from the combustion chamber 111 via the residue outlet 112.

Afterwards, the boiler device 2 receives the heated air from the incinerator 11 and generates the high-pressure steam at a high temperature via the heated air, and the steam is transported to each of the hydrolysis chamber 311 of the tank 31 and the power generating device 4 via the gas supply pipes 51 so that a thermal hydrolysis process and a power generation process may be respectively carried out by the thermal hydrolysis device 3 and the power generating device 4. Since a process of generating the steam via the heated air that is carried out by the boiler device 2 and the power generation process that is carried out by the power generating device 4 are widely-understood by those skilled in the art, detailed descriptions thereof are omitted.

When the thermal hydrolysis device 3 carries out the thermal hydrolysis process, the hydrolysis matter is fed into the hydrolysis chamber 311 through the hydrolysis feed hopper 32, and the steam is transported to the hydrolysis chamber 311 such that the tank 31 receives the hydrolysis matter and the steam. The hydrolysis actuation unit 34 drives the hydrolysis stirring unit 33 to continuously or intermittently rotate and stir the hydrolysis matter so that the hydrolysis matter is uniformly heated by the steam and is converted to the regenerative matter (i.e., the thermal hydrolysis device 3 hydrolyzes the hydrolysis matter via the steam and generates the regenerative matter by hydrolyzing the hydrolysis matter). Then, the thermal hydrolysis device 3 outputs the regenerative matter. Specifically, the regeneration pipe 38 transports the regenerative matter from the regeneration outlet 313 to the recycling unit 37. A portion of the regenerative matter may be transported by the transfer pipe 39 from the regeneration pipe 38 to the incineration feed pipe 13 and then be transported into the combustion chamber 111 by the incineration feed pipe 13 so that the portion of the regenerative matter may serve as another incineration matter that is fed into the incinerator 11. Consequently, cost of the incineration matter may be reduced.

In this embodiment, the hydrolysis matter may be business waste or household waste. However, in one embodiment, the hydrolysis matter may further include a humidity control material (not shown) that is capable of absorbing water. Water content in the humidity control material is generally less than 30%. In certain embodiments, the water content may be less than 15% so that the humidity control material may adsorb harmful heavy metal ions generated during the thermal hydrolysis process. The humidity control material may be an organic material such as woodchips and husks (e.g., wheat husks and rice husks), or an inorganic material such as quicklime, zeolite, or pumice. The regenerative matter is Solid Recovered Fuel (hereinafter SRF).

When the thermal hydrolysis process is completed, dust and the steam in the hydrolysis chamber 311 will be discharged from the hydrolysis outlet 312 and transported to the collecting unit 35 via the collection pipe 36 so that pressure in the hydrolysis chamber 311 may be reduced to a standard air pressure (i.e., about 0.1 MPa). Generally, process of discharging the steam lasts 50 to 60 minutes.

In this embodiment, the collecting unit 35 is a wired cyclone separator, and volume thereof ranges from 0.5 to 1.5 times of volume of hydrolysis chamber 311. In one embodiment, the collecting unit 35 may be a water-cooled condenser, and volume thereof ranges from 3 to 10 times of the tank 311, In another one embodiment, the collecting unit 35 may be omitted (i.e., the steam and the dust are directly released into air).

In summary, by virtue of the steam that is generated by the boiler device 2 via the heated air from the incineration device 1 being transported to each of the thermal hydrolysis device 3 and the power generating device 4, the incineration system may carry out both of the thermal hydrolysis process and the power generation process. By virtue of the thermal hydrolysis device 3 converting the hydrolysis matter to SRF (i.e., the regenerative matter) via the thermal hydrolysis process, the incineration system may provide products that serve as an alternative to conventional fuels. The products may be supplied to factories that use a large quantity of fuels, such as cogeneration plants, paper mills, or dyeing and finishing plants. In addition, the electric power generated by the power generating device 4 may be used by a plant that has the incineration system, or be sold to other organizations. That is to say, via the incineration system, energy is reused and efficiently utilized. Thus, the purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An incineration system adapted for burning an incineration matter, and for generating a regenerative matter by hydrolyzing a hydrolysis matter, said incineration system comprising:

an incineration device including an incinerator that is adapted for receiving the incineration matter and for burning the incineration matter to thereby generate heated air;

a boiler device receiving said heated air from said incinerator and generating steam via said heated air;

a power generating device receiving said steam from said boiler device to generate electric power; and a thermal hydrolysis device including a tank that is adapted for receiving the hydrolysis matter and said steam, said thermal hydrolysis device being adapted for hydrolyzing the hydrolysis matter via said steam, for generating the regenerative matter by hydrolyzing the hydrolysis matter, and for outputting the regenerative matter.

2. The incineration system as claimed in claim 1, wherein said incinerator defines a combustion chamber, said incineration device further including an incineration stirring unit that is disposed in said combustion chamber, and an incineration actuation unit that is disposed on said incinerator and that is operable to drive said incineration stirring unit to rotate so that said incineration stirring unit stirs the incineration matter.

3. The incineration system as claimed in claim 1, further comprising a steam pipe unit, said steam pipe unit including two gas supply pipes, one of said gas supply pipes interconnecting said boiler device and said tank, the other one of said gas supply pipes interconnecting said boiler device and said power generating device.

4. The incineration system as claimed in claim 1, wherein said incineration device further includes an air pipe that interconnects said incinerator and said boiler device and that transports said heated air from said incinerator to said boiler device.

5. The incineration system as claimed in claim 1, wherein said incineration device further includes an emergency discharge unit that is disposed on said incinerator, said emergency discharge unit being operable to discharge gas from said incinerator when a value of pressure in said incinerator is greater than a predetermined pressure value.

6. The incineration system as claimed in claim 1, wherein said tank defines a hydrolysis chamber, said thermal hydrolysis device further including a hydrolysis stirring unit that is disposed in said hydrolysis chamber, and a hydrolysis actuation unit that is disposed on said tank and that is operable to drive said hydrolysis stirring unit to rotate so that said hydrolysis stirring unit stirs said hydrolysis matter.

7. The incineration system as claimed in claim 1, wherein said thermal hydrolysis device further includes a collecting unit, said tank having a hydrolysis outlet that is in spatial communication with said collecting unit.

8. The incineration system as claimed in claim 1, wherein said thermal hydrolysis device further includes a recycling unit and a regeneration pipe, said tank having a regeneration outlet, said regeneration pipe being connected to said regeneration outlet and being adapted for transporting the regenerative matter from said regeneration outlet to said recycling unit.

9. The incineration system as claimed in claim 8, wherein said incineration device further includes an incineration feed hopper that is adapted for receiving the incineration matter, and an incineration feed pipe that interconnects said incineration feed hopper and said incinerator and that is adapted for transporting the incineration matter from said incineration feed hopper into said incinerator.

10. The incineration system as claimed in claim 9, wherein said thermal hydrolysis device further includes a transfer pipe that interconnects said regeneration pipe and said incineration feed pipe and that is adapted for transporting the regenerative matter into said incinerator.

* * * * *